United States Patent
Bilik

(10) Patent No.: US 9,285,468 B2
(45) Date of Patent: Mar. 15, 2016

(54) EXTENDED ANGULAR RESOLUTION IN SENSOR ARRAYS USING SECONDARY ECHOES

(71) Applicant: Igal Bilik, Rehovot (IL)

(72) Inventor: Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 13/630,300

(22) Filed: Sep. 28, 2012

(65) Prior Publication Data

US 2014/0015708 A1   Jan. 16, 2014

Related U.S. Application Data

(60) Provisional application No. 61/670,962, filed on Jul. 12, 2012.

(51) Int. Cl.
*G01S 13/46* (2006.01)
*G01S 13/93* (2006.01)
(Continued)

(52) U.S. Cl.
CPC .............. *G01S 13/42* (2013.01); *G01S 13/58* (2013.01); *G01S 13/931* (2013.01); *G01S 15/06* (2013.01); *G01S 15/93* (2013.01); *G01S 15/931* (2013.01);
(Continued)

(58) Field of Classification Search
CPC ......... G01S 13/02; G01S 13/06; G01S 13/42; G01S 13/46; G01S 2013/462; G01S 13/50; G01S 13/58; G01S 13/88; G01S 13/93; G01S 13/931; G01S 2013/9364; G01S 2013/9367; G01S 2013/9371; G01S 2013/9375; G01S 15/02; G01S 15/06; G01S 15/93; G01S 15/931; G01S 15/46; G01S 2015/465; G01S 2013/466; G01S 2013/468
USPC .............. 367/87, 89–91, 95, 96, 99, 117; 342/29–51, 61, 70–72, 104–115, 342/118–127, 175, 195, 146, 147, 68
See application file for complete search history.

(56) References Cited

U.S. PATENT DOCUMENTS 3,158,859 A * 11/1964 Resnik ............................. 342/68
3,611,379 A * 10/1971 Deckett ......................... 342/125
(Continued)

FOREIGN PATENT DOCUMENTS

CN       101156078 A    4/2008
DE       31 15 678 A1   1/1982
(Continued)

OTHER PUBLICATIONS

Office Action CN Application No. 201310463633.1 dated Aug. 10, 2015.
(Continued)

*Primary Examiner* — Bernarr Gregory
(74) *Attorney, Agent, or Firm* — Mark S. Cohen; Pearl Cohen Zedek Latzer Baratz LLP

(57) ABSTRACT

A reflector is used to extend an aperture of an omni-directional, single-point remote-sensing echo-system utilizing secondary round-trip reflections of a transmitted sensor signal. The reflector is spatially displaced from a transmission element to contribute a secondary reflection whose echo from the target object provides additional information used to triangulate both azimuthal and elevation angles of the target object.

12 Claims, 6 Drawing Sheets

(51) Int. Cl.
    *G01S 15/46*     (2006.01)
    *G01S 15/93*     (2006.01)
    *G01S 13/42*     (2006.01)
    *G01S 15/06*     (2006.01)
    *G01S 13/58*     (2006.01)
    *G01S 13/00*     (2006.01)
    *G01S 15/00*     (2006.01)

(52) U.S. Cl.
    CPC ..... *G01S 2013/462* (2013.01); *G01S 2013/468* (2013.01); *G01S 2013/9364* (2013.01); *G01S 2013/9367* (2013.01); *G01S 2013/9375* (2013.01)

(56) References Cited

U.S. PATENT DOCUMENTS

| | | | | |
|---|---|---|---|---|
| 3,810,179 | A * | 5/1974 | Merrick | G01S 13/46 342/46 |
| 3,860,921 | A * | 1/1975 | Fletcher et al. | 342/109 |
| 3,918,056 | A * | 11/1975 | Merrick | G01S 13/46 342/125 |
| 4,464,662 | A * | 8/1984 | Tomasi | 342/125 |
| 4,551,726 | A | 11/1985 | Berg | |
| 5,191,328 | A * | 3/1993 | Nelson | 342/125 |
| 5,504,489 | A * | 4/1996 | Kronhamn | 342/118 |
| 5,504,569 | A * | 4/1996 | Kato et al. | 342/126 |
| 5,589,981 | A | 12/1996 | Kasser et al. | |
| 5,606,325 | A * | 2/1997 | Masudaya | 342/42 |
| 5,767,409 | A * | 6/1998 | Yamaguchi | 342/125 |
| 6,072,421 | A * | 6/2000 | Fukae et al. | 342/42 |
| 6,295,019 | B1 * | 9/2001 | Richards et al. | 342/125 |
| 6,674,396 | B2 * | 1/2004 | Richards et al. | 342/125 |
| 6,922,166 | B2 * | 7/2005 | Richards et al. | 342/125 |
| 7,062,381 | B1 * | 6/2006 | Rekow et al. | 342/126 |
| 7,250,901 | B2 * | 7/2007 | Stephens | 342/146 |
| 7,315,275 | B2 * | 1/2008 | Stephens | 342/146 |
| 7,350,945 | B2 | 4/2008 | Albou et al. | |
| 7,486,226 | B2 * | 2/2009 | Edvardsson | 342/118 |
| 2003/0090411 | A1 | 5/2003 | Haney et al. | |
| 2005/0088335 | A1 * | 4/2005 | Stephens | 342/146 |
| 2005/0270227 | A1 * | 12/2005 | Stephens | 342/146 |
| 2006/0114146 | A1 * | 6/2006 | Lindenmeier et al. | 342/125 |
| 2010/0114490 | A1 | 5/2010 | Becker | |
| 2011/0317015 | A1 | 12/2011 | Seto et al. | |

FOREIGN PATENT DOCUMENTS

| | | |
|---|---|---|
| DE | 10 210 028 829 A1 | 11/2011 |
| FR | 2495797 A1 | 6/1982 |
| GB | 1376106 A | 12/1974 |
| JP | 1998062550 A | 4/1999 |

OTHER PUBLICATIONS

Office Action DE Application No. 10 2013 213 509.2 dated Oct. 7, 2015.

\* cited by examiner

EXTENDED ANGULAR RESOLUTION IN SENSOR ARRAYS USING SECONDARY ECHOES

BACKGROUND

The angular resolution of a conventional remote sensing echo system depends on the linear extent of the echo transmitting/receiving aperture. A single-point transmitting/receiving element (having a linear extent that is small in comparison with the transmitted wavelength) is essentially omni-directional, and does not provide for resolving the target's angular direction.

Using multiple single-point transmitting/receiving elements spatially-arranged in an array provides for angular resolution.

SUMMARY

Embodiments of the present invention provide utilizing secondary round-trip reflections of the transmitted sensor signal from a target. In embodiments of the invention, temporal information from the secondary echoes off the target is interpreted as additional spatial information related to the target. Certain embodiments of the invention provide spatial information (such as angular displacement of the target) which is otherwise not readily available. Other embodiments of the invention provide increased spatial target resolution. A particular embodiment for use with a real sensor array, for example, provides a virtual sensor array having a resolution equivalent to the real array of doubled size.

Secondary reflections, sometimes referred to as "ghost" reflections, are well-known, and typically are encountered when a portion of the signal reflected by the target undergoes an additional reflection from an incidental object, such as an object in proximity to the signal's return path. A special case occurs when a portion of the return signal reflects off the transmitter/receiver, returns to the target, and is reflected back again to the transmitter/receiver. That is, a portion of the emitted signal does a double round-trip, in the process undergoing three reflections instead of one. The ghost signal in this case appears to be at twice the distance. The target appears to be moving with a velocity that is twice the velocity as indicated for the target object by the primary reflected signal.

Embodiments of the invention are applicable to electromagnetic remote sensing echo systems (such as Radar and Lidar) as well as to acoustic remote sensing echo systems (such as Active Sonar and Lidar). Embodiments of the present invention are illustrated herein in the non-limiting case of automotive radar, but further embodiments can also be applied in other areas as well, including, but not limited to: suitable regimes of radar and electromagnetic spectrum sensing, laser sensors, and optical sensors in both the visible and non-visible portions of the spectrum; and suitable regimes of acoustical sensing, sonar, and ultrasound.

Therefore, according to an embodiment of the present invention, there is provided a method for measuring an angular direction of an object and a method for separation between closely spaced objects, the method including transmitting a signal; receiving a first echo of the signal from the object; redirecting the first echo back towards the object; receiving a second echo from the object; and computing an angular direction of the object using joint measurements of the first echo and the second echo.

In addition, according to another embodiment of the present invention, there is provided an apparatus for measuring an angular direction of an object, the apparatus including: a signal transmission element operative to transmit a signal towards the object in the vicinity of the apparatus; a signal reception element operative to receive a first echo of the signal from the object; a signal retransmission device operative to return the first echo towards the object, such that the signal receiver receives a second echo from the object; and a processor operative to compute an angular direction of the object based on measurements of the first echo and the second echo.

BRIEF DESCRIPTION OF THE DRAWINGS

The subject matter disclosed may best be understood by reference to the following detailed description when read with the accompanying drawings in which.

Figure 1:
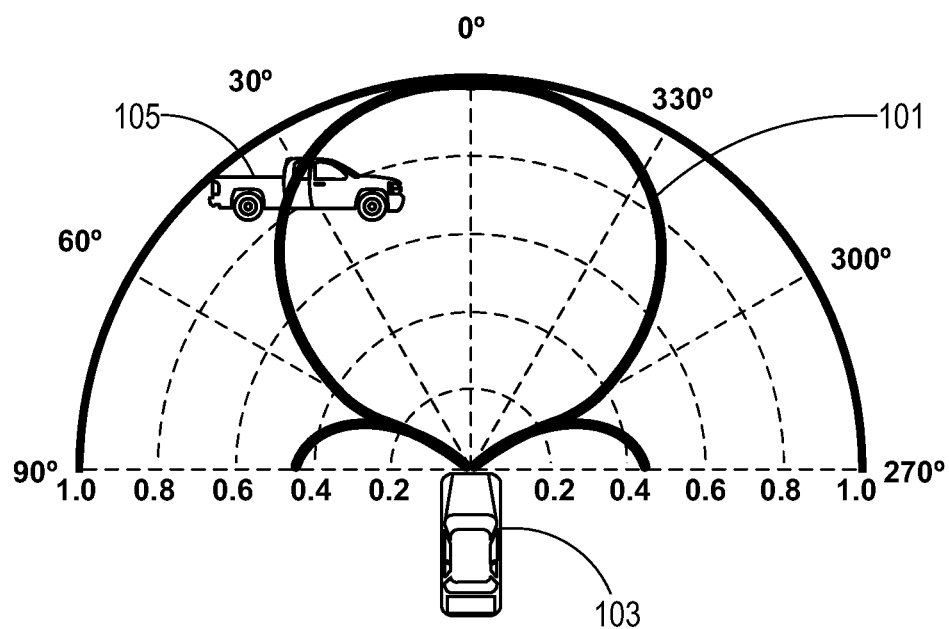
FIG. 1 conceptually illustrates a prior art automotive radar pattern.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 conceptually illustrates a prior art automotive radar pattern 101 emanating from a vehicle radar system 103 and providing coverage of an object 105 ahead of vehicle 103. The broad lobe shape of radar pattern 101 is such that the angular direction of object 105 cannot be accurately determined by the radar system to within a meaningful angular accuracy. Moreover when two targets are presented within the small angle, they can not be distinguished or resolved, and thus the radar pattern 101 limits the angular resolution of the automotive radar. At best, the automotive radar system can detect the distance of object 105 and the rough location of object 105 as being in front of vehicle 103, as opposed to being behind or to the side of vehicle 103.

FIG. 2A through FIG. 2D conceptually illustrate angular direction measurements for an object 213 by signal transmission and reception from an angular direction sensor system 201 utilizing a transmission element 203, a reception element 205, and a signal retransmission device 207 according to an embodiment of the invention. For example, the sensors of angular direction sensor system 201 may include radar, sonar, or lidar receivers or transceivers. Each sensor measures the time of flight of a signal that was transmitted by a transmitter or transceiver of the array and was received by the sensor.

In a related embodiment of the invention, signal retransmission device 207 is a passive reflector, such as a corner cube. In another related embodiment, signal transmission device 207 is an active repeater. Any such reflector, repeater, or other device that is capable of returning an incident signal is herein referred to as a retransmission device. Any returning of an incident signal, such reflecting, repeating, or otherwise transmitting a signal that was incident on the retransmission device, is herein interchangeably referred to as retransmission or returning of the signal.

Figure 2A:
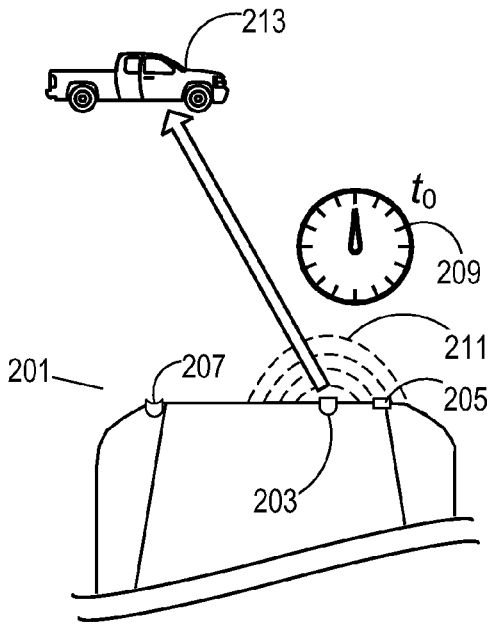
FIG. 2A through FIG. 2D conceptually illustrate azimuthal angular direction measurements by signal transmission and reception utilizing a reflector according to an embodiment of the invention.

In FIG. 2A, a signal 211 is emitted by transmission element 203 at a time $t_0$ 209, such that signal 211 can reach object 213. Time $t_0$ 209 is directly measurable and is known to angular direction sensor system 201.

Figure 2B:
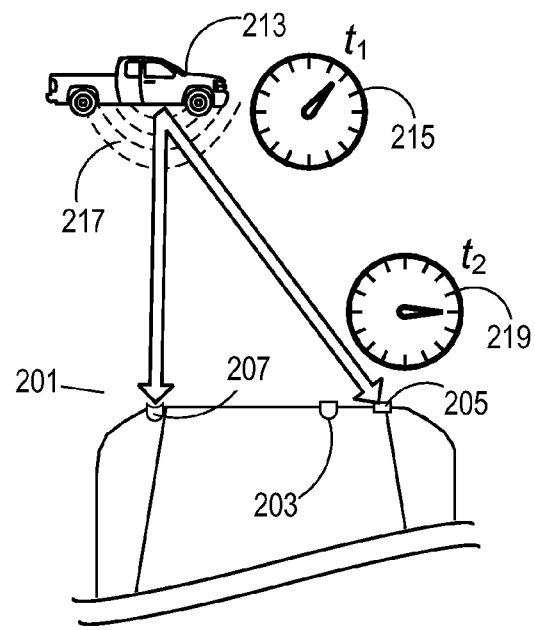

In FIG. 2B, an echo 217 of signal 211 is reflected from object 213 at a time $t_1$ 215, such that echo 217 can reach reception element 205 and signal retransmission device 207. Echo 217 arrives at reception element 205 at a time $t_2$ 219. Time $t_2$ 219 is directly measurable and is known to angular direction sensor system 201.

Figure 2C:
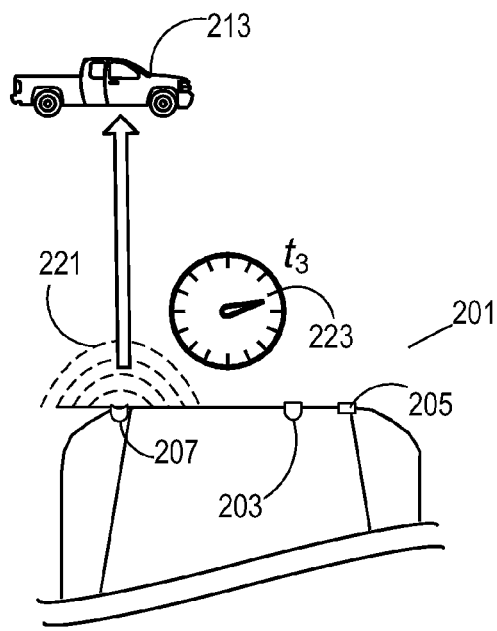

In FIG. 2C, echo 217 of signal 211 arrives at retransmission device 207 at a time $t_3$ 223, and retransmission device 207 sends out a retransmission 221 of echo 217 also at time $t_3$ 223, such that retransmission 221 can reach object 213.

Figure 2D:
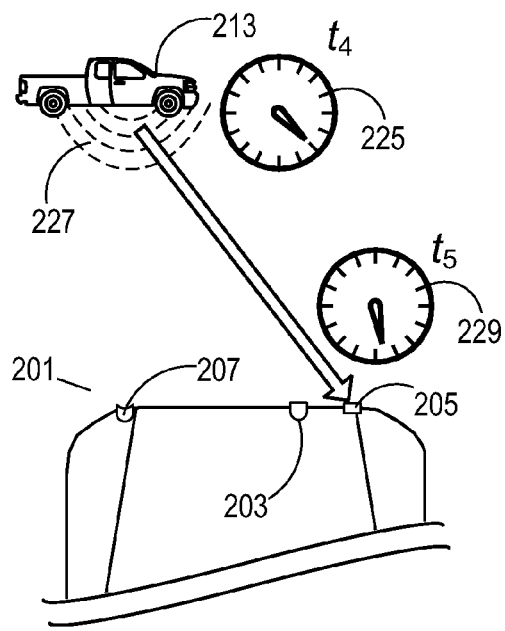

In FIG. 2D, an echo 227 of retransmission 221 is reflected from object 213 at a time $t_4$ 225, such that echo 227 can reach reception element 205. Echo 227 arrives at reception element 205 at a time $t_5$ 229. Time $t_5$ 229 is directly measurable and is known to angular direction sensor system 201.

Figure 3:
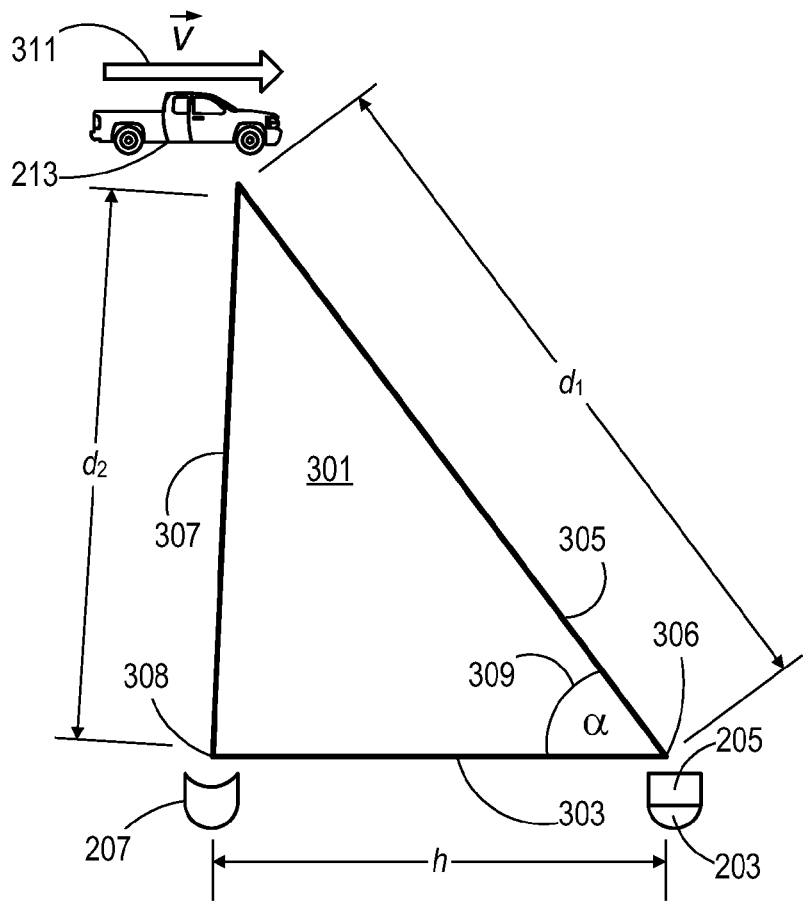
FIG. 3 illustrates a simplified geometry for the examples illustrated in FIG. 2A through FIG. 2D.

FIG. 3 illustrates a simplified geometry for the examples illustrated in FIG. 2A through FIG. 2D. In this simplified geometry, transmission element 203 and reception element 205 are shown as being in the same point, at a vertex 306 of a triangle 301. In some embodiments of the invention, transmission element 203 and reception element 205 are combined into a single device (e.g. a transceiver). Object 213 is at the upper vertex of triangle 301, and retransmission device 207 is at a vertex 308 of triangle 301. A base 303 of triangle 301 has a length corresponding to the predetermined fixed physical distance between transmission element 203/reception element 205 and retransmission device 207, which distance is denoted as h. In various embodiments of the invention, retransmission device 207 is spatially displaced from transmission element 203/reception element 205 by a predetermined distance, such as h. In other embodiments of the invention, reception element 205 a spatial extent that is larger then the displacement distance h (e.g. includes an array of individual receivers that are spatially separated from one another). For example, if reception element 205 includes N elements with inter-element spacing d, its aperture is d·N>h. Therefore, in general, an angular direction sensor system 201 with retransmission device 207 need not have a larger aperture than a prior art device that lacks a retransmission device. Thus, embodiments of the present invention may be used to increase angular resolution of direction sensing system without increasing the aperture of the system.

An angular direction α 309 represents the azimuthal angular direction of object 213 relative to transmission element 203/reception element 205, i.e., the angular direction of a side 305 of triangle 301. In another embodiment of the invention, a computed angular direction corresponds to the angular direction of a side 307 of triangle 301. In certain other embodiments of the invention which perform Doppler shift measurements to compute a speed of object 213 relative to angular direction sensor system 201, an angular direction of object 213 is an angular component of a vector velocity $\vec{v}$ 311 of object 213.

Figure 4:
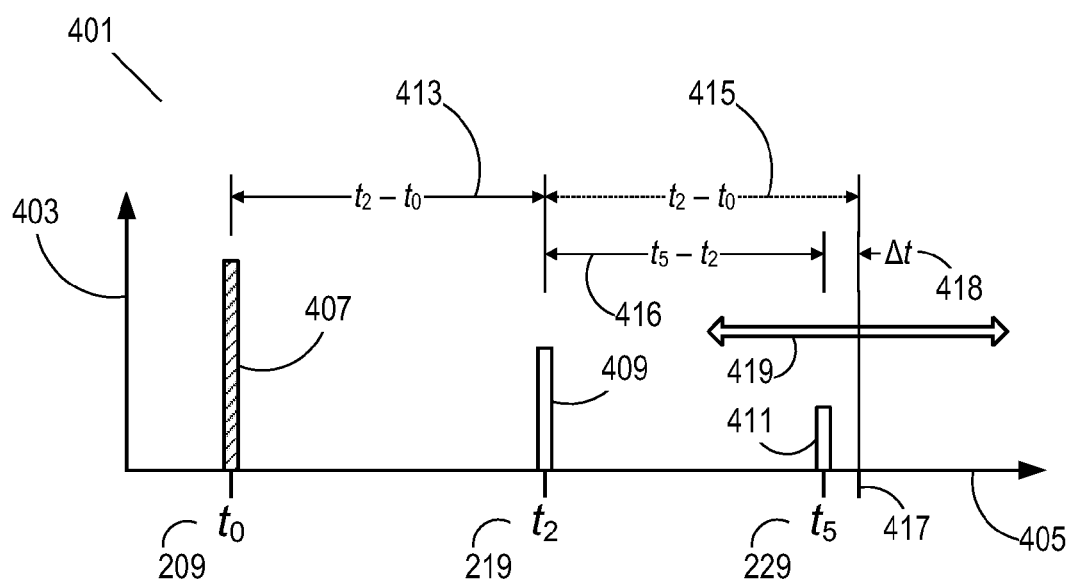
FIG. 4 illustrates timing measurements for the examples illustrated in FIG. 2A through FIG. 2D.

FIG. 4 illustrates a timing chart 401 for the examples illustrated in FIG. 2A through FIG. 2D. On a time axis 405 are shown the times which are directly measurable and known to angular direction sensor system 201, namely time $t_0$ 209, time $t_2$ 219, and time $t_5$ 229. An amplitude axis 403 conceptually illustrates the amplitudes of the signals involved. Signal 211, which is transmitted at time $t_0$ 209 (FIG. 2A), is shown as an amplitude 407. Echo 217, which is received at time $t_2$ 219 (FIG. 2B) is a smaller amplitude 409. Echo 227, which is received at a time $t_5$ 229 (FIG. 2D) is an even smaller amplitude 411.

A time interval 413 between time $t_0$ 209 and time $t_2$ 219 ($t_2-t_0$) corresponds to the time for signal 211 to travel to object 213 (FIG. 2A) and then for echo 217 to return (FIG. 2B). In the simplified geometry of FIG. 4, this is the length of side 305 times two, denoted as $2d_1$. In embodiments of the invention utilizing electromagnetic signals (such as radar or lidar systems), then the time-distance relation is expressed as $$(t_2 - t_0) = \frac{2d_1}{c},$$

where c is the speed of light. In other embodiments utilizing acoustical signals (such as sonar systems), a similar relationship holds, where the speed of light is replaced with the speed of sound.

If retransmission 211 were performed by transmission element 203, corresponding to vertex 306 of triangle 301, then time interval ($t_5-t_2$) would correspond to a second round-trip of side 305 of triangle 301 and would be equal to time interval ($t_2-t_0$), as represented in FIG. 4 by a time 417 on time axis 405. As shown in FIG. 2C, however, retransmission 221 is performed by retransmission device 207, which is spatially displaced in position from transmission element 203 to vertex 308 of triangle 301. Thus, in general time $t_5$ 229 is temporally displaced by a time increment/decrement Δt 418 to be a time ($t_5-t_2$) 416, because of the spatial displacement of retransmission device 207 from transmission element 203. In effect, $t_5$ 229 is the time for a round-trip of side 305 of triangle 301 plus a round-trip of side 307 of triangle 301. That is, $$(t_5 - t_2) = \frac{2(d_1 + d_2)}{c}.$$

Letting $t_0=0$ without loss of generality, the sides of triangle 301 are thus:

Side 303 - $h$(from direct physical measurement);

Side 305 - $d_1 = \frac{ct_2}{2}$; and

Side 307 - $d_2 = \frac{ct_5}{2} - d_1 = \frac{c}{2}(t_5 - t_2)$

Therefore, given the time measurements of $t_2$ and $t_5$, the three sides of triangle 301 are known, and triangle 301 can be solved (such as with the cosine rule) to obtain angular direction α 309. In other embodiments of the invention, angular direction is measured relative to different points. For example, in one embodiment, angular direction is measured from the midpoint of base 303 of triangle 301. Transformation from angular direction α 309 to an angular direction relative to another desired reference point is easily performed using standard methods.

The description and equations above relate to time measurements involving pulse signals. Embodiments of the invention utilizing phase difference measurements are presented and discussed below.

In FIG. 4, time ($t_2-t_0$) 417 and time increment/decrement Δt 418 are shown to emphasize the point that in certain applications (such as automotive radar), both $d_1$ and $d_2$ are generally much larger than h, so that $d_2 \approx d_1$, and thus increment/decrement Δt 418 is generally small. Thus, echo 227 can be expected to arrive at reception element 205 during a time interval 419. Accordingly, a signal processor can use a rectangular filter to isolate time interval 419 when measuring $t_5$ to improve recognition of echo 227, which may be weaker than echo 217, particularly if retransmission device 207 is a passive reflector.

Figure 5A:
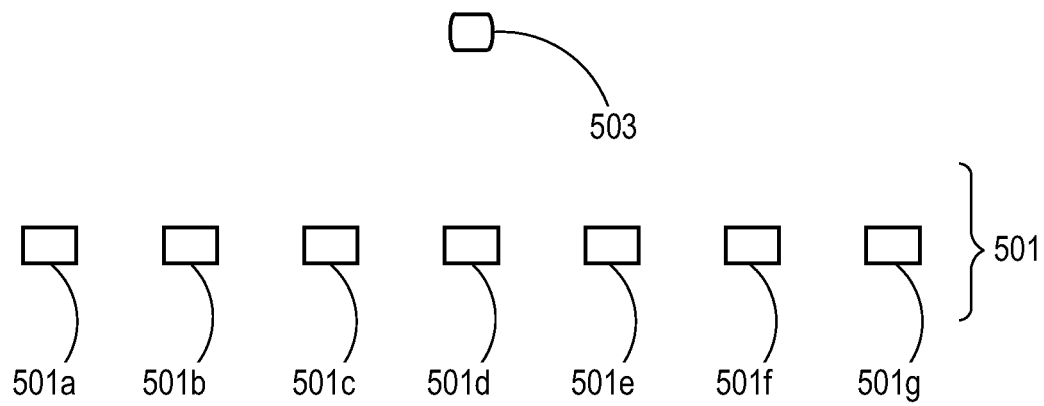
FIG. 5A conceptually illustrates a sensor array with a retransmission element displaced orthogonally from the array, according to an embodiment of the invention.
Figure 5B:
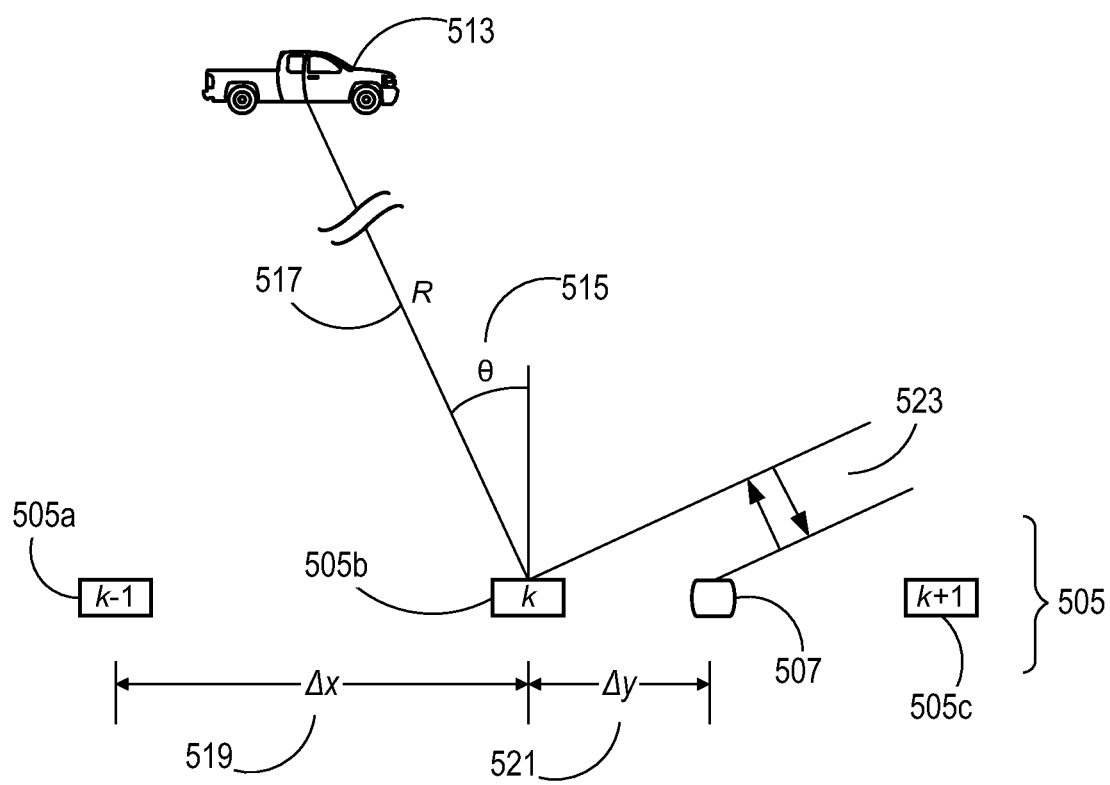
FIG. 5B conceptually illustrates a portion of a sensor array with a retransmission element interposed within the array, according to another embodiment of the invention.

FIG. 5A schematically illustrates a sensor array 501 having a retransmission element 503 according to an embodiment of the invention. Sensor array 501 includes sensors 501a, 501b, 501c, 501d, 501e, 501f, and 501g, arranged horizontally, so that sensor array 501 can determine an azimuthal angular direction of a target object through known phased-array techniques. In FIG. 5A, retransmission element 503 is shown in an embodiment as displaced orthogonally from sensor array 501. FIG. 5B, discussed below, shows a retransmission element interposed collinearly with the sensor array, such as between a pair of adjacent sensors.

According to an embodiment of the present invention, retransmission element 503 may include a retroreflector (e.g. a corner reflector). According to another embodiment of the invention, retransmission element 503 includes an active repeater. An active repeater involves greater hardware cost than a passive reflector, but produces a stronger retransmitted signal and therefore results in a stronger received echo.

In various embodiments of the invention, the transmitted sensor signal is a pulse. In additional embodiments, the transmitted signal is a continuous wave. In further embodiments, the frequency of the transmitted signal is swept, resulting in a "chirp". Other embodiments of the invention feature different waveforms. Thus, depending on the transmitted waveform, embodiments of the invention perform processing of the received signals with techniques involves time discrimination, frequency discrimination, or both time and frequency discrimination.

FIG. 5B conceptually illustrates an embodiment of the invention using differential phase measurements. A portion of an array 505 includes sensors 505a, 505b, and 501c, arranged horizontally, so that sensor array 505 can determine an azimuthally angular direction of a target object through known phased-array techniques. Sensor 505a is element k−1 of array 505, sensor 505b is element k of array 505, and sensor 505c is element k+1 of array 505. Elements of array 505 have a constant linear spacing 519, denoted as Δx. Interposed within array 505 is a retransmission element 507, located a distance 521 from element k (sensor 505b). Distance 521 is denoted as Δy. A target 513 is located at a distance 517, denoted as R, at an angular displacement 515, denoted as angle θ. Distance R 517 is large compared to the dimensions of array 505, so that angle θ515 and distance R 517 are substantially constant across all sensor elements of array 505. A wavefront phase retardation 523 is illustrated for element k (sensor 505b), for a wavelength λ.

First echo phase retardation $\phi_{1k}$ at sensor k 505b is given by $$\phi_{1k} = \frac{2\pi}{\lambda}(2R + k\Delta x \sin\theta)$$

Second echo phase retardation $\phi_{2k}$ at sensor k 505b is given by $$\phi_{2k} = \frac{2\pi}{\lambda}(4R + (k\Delta x + 2\Delta y)\sin\theta)$$

Figure 6:
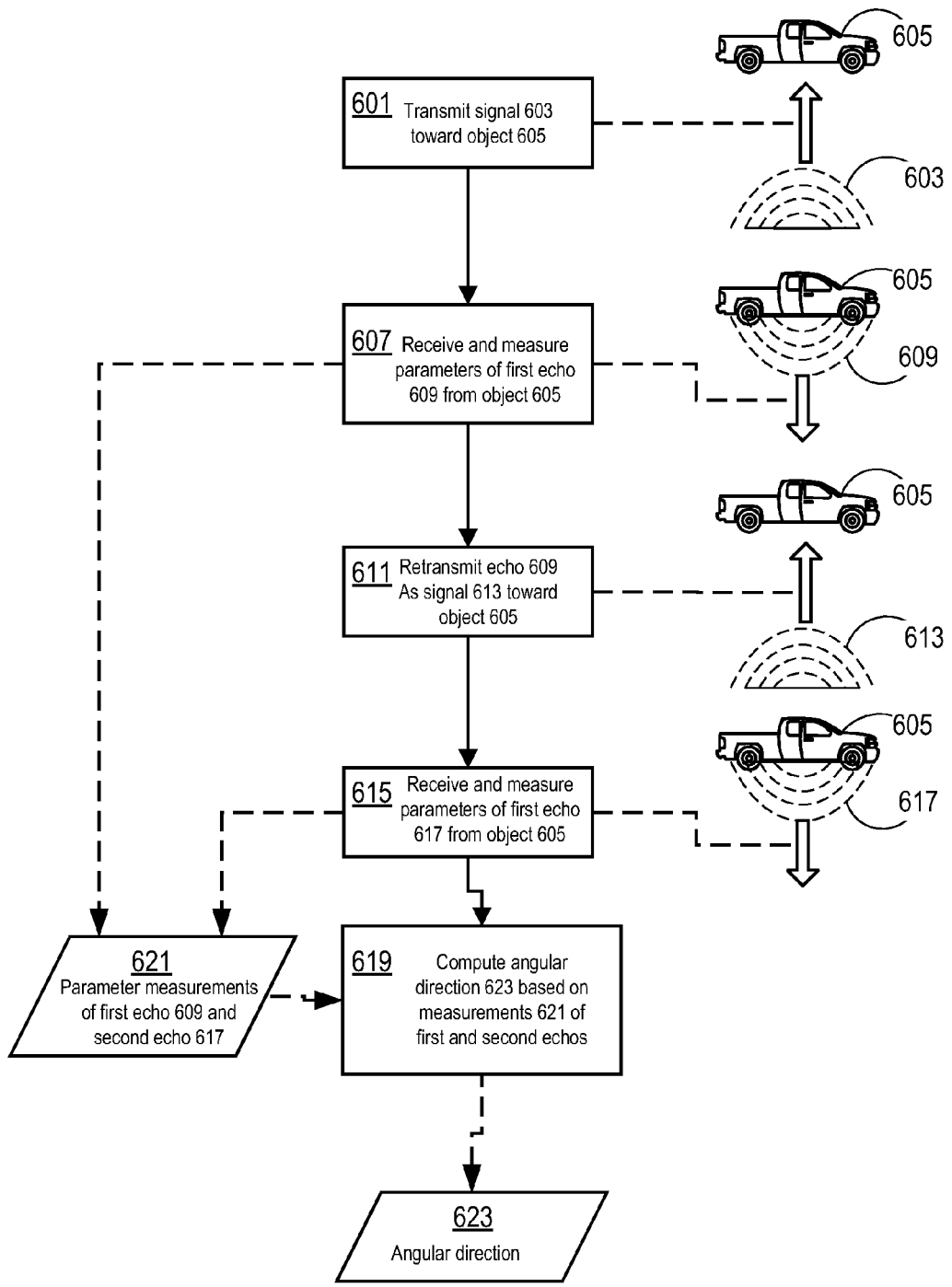
FIG. 6 is a flowchart of a method for angular direction measurements according to an embodiment of the invention.

FIG. 6 is a flowchart of a method for angular direction measurements according to an embodiment of the invention. In a step 601 a signal 603 is transmitted toward an object 605. In a step 607 an echo 609 is received from object 605, and measurements of echo 609 are taken and stored in a measurement storage 621. In a step 611 a signal 613, which is a retransmission of received echo 609, is retransmitted toward object 605. In a step 615 an echo 617 is received from object 605, and measurements of echo 617 are taken and stored in measurement storage 621. In a step 619 measurements of echo 609 and echo 617 are used to compute an angular direction 623.

Different embodiments of the invention utilize methods similar to the method illustrated in FIG. 6, with adjustments as necessary according to the embodiments. For example, in an embodiment of the invention, retransmitting signal 613 is done by a passive reflector; in another embodiment, retransmitting signal 613 is done by an active repeater. In an embodiment of the invention, angular direction 623 is an azimuthal angle; in another embodiment, angular direction 623 is an elevation angle. In an embodiment of the invention, measurements of echo 609 and echo 617 are time measurements; in another embodiment, measurements of echo 609 and echo 617 are frequency measurements. In an embodiment of the invention, angular direction 623 is of a position vector of object 605; in another embodiment, angular direction 623 is of a velocity vector of object 605.

Figure 7:
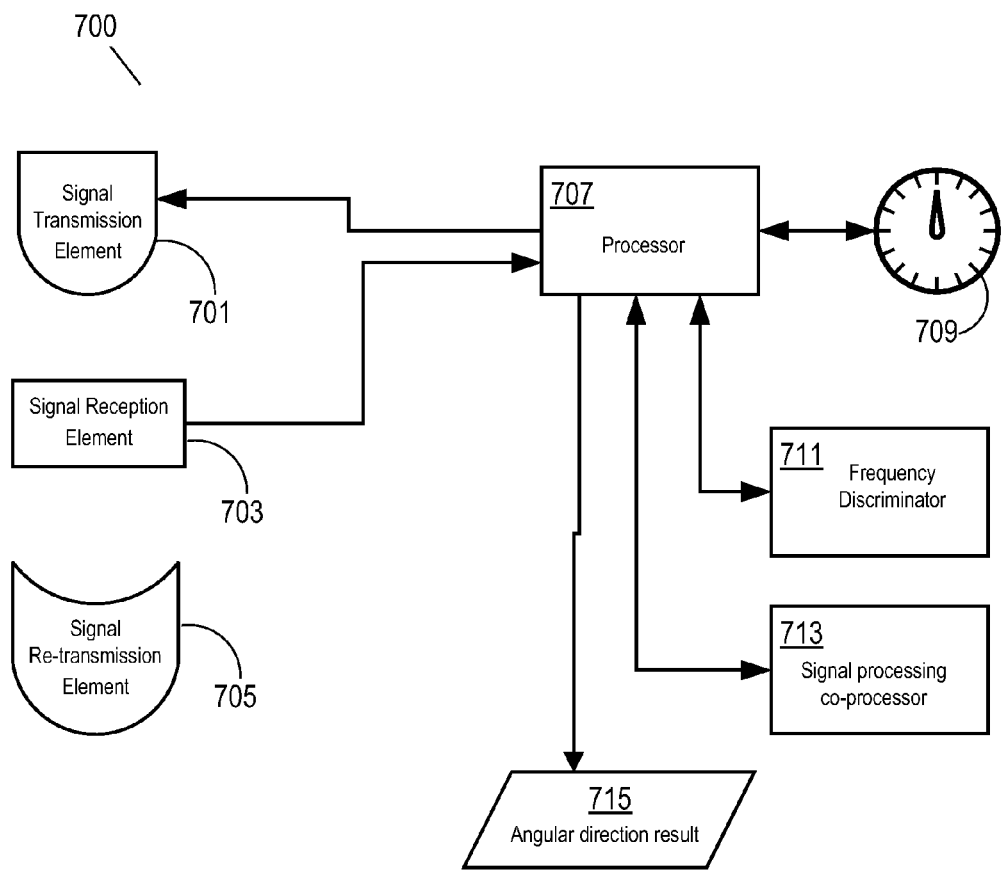
FIG. 7 is a block diagram of an apparatus for angular direction measurements according to an embodiment of the invention.

FIG. 7 is a block diagram of an apparatus 700 for angular direction measurements according to an embodiment of the invention. A signal transmission element 701 is controlled by a processor 707, which receives input from a signal reception element 703. In this embodiment, a signal retransmission element 705 is independent of processor 707, but is part of apparatus 700. In another embodiment of the invention, signal retransmission element 705 is an active repeater which receives power from apparatus 700. In certain embodiments, apparatus 700 includes a clock 709. In other embodiments, apparatus 700 includes a frequency discriminator 711. In still other embodiments, apparatus 700 includes a signal processing co-processor 713. The result of computations by processor 707 is an angular direction 715.

What is claimed is:

1. A method for resolving an angular direction of an object, the method comprising:
   transmitting a signal towards an object from a transmitter at transmission time, $t_0$;
   receiving a first echo of the signal from the object at a receiver at receipt time $t_2$;
   directing the first echo of the signal towards the object from a reflector displaced from the receiver;
   receiving the second echo of the signal from the object at the receiver at second receipt time $t_5$; and
   using a processor configured to triangulate an azimuthal angular direction of the object based on a delay between the times $t_2$ and $t_5$, the azimuthal angular direction relative to a line defined by the transmitter and the receiver.

2. The method of claim 1, wherein the transmitter and the reflector are mounted on a vehicle.

3. The method of claim 2, wherein the directing the first echo comprises reflecting the first echo.

4. The method of claim 2, wherein the directing the first echo comprises actively repeating the first echo.

5. The method of claim 1, wherein the signal is implemented as an acoustic signal.

6. The method of claim 1, wherein the azimuthal angular direction of the object includes an elevation component.

7. An apparatus for resolving an angular direction of an object, the apparatus comprising:
- a signal transmission element operative to transmit a signal towards the object at a transmission time, $t_0$;
- a signal reception element operative to receive a first echo of the signal from the object at a first receipt time, $t_2$;
- a signal retransmission device displaced from the transmission element, the retransmission device operative to direct the first echo of the signal towards the object such that the signal receiver receives a second echo of the signal from the object at a second receipt time, $t_5$; and
- a processor operative to triangulate an azimuthal angular direction of the object relative to the transmission element based on a delay between the times $t_2$ and $t_5$, the azimuthal angular direction relative to a line defined by the transmitter and the receiver.

8. The apparatus of claim 7, wherein the signal is implemented as an acoustical signal.

9. The apparatus of claim 8, wherein the signal retransmission device is implemented as a passive signal reflector.

10. The apparatus of claim 8, wherein the signal retransmission device is implemented as an active signal repeater.

11. The apparatus of claim 7, wherein the signal retransmission device and the reflector are mounted on a vehicle.

12. The apparatus of claim 7, wherein the azimuthal angular direction of the object includes an elevation component.

\* \* \* \* \*